United States Patent
Moscovitch

(10) Patent No.: US 7,390,211 B2
(45) Date of Patent: Jun. 24, 2008

(54) UNIVERSAL QUICK CONNECTOR APPARATUS FOR AN LCD MONITOR

(76) Inventor: Jerry Moscovitch, 86 Truman Road, Toronto, Ontario (CA) M2L 2L6

( * ) Notice: Subject to any disclaimer, the term of this patent is extended or adjusted under 35 U.S.C. 154(b) by 0 days.

(21) Appl. No.: 10/764,572

(22) Filed: Jan. 27, 2004

(65) Prior Publication Data
US 2005/0085123 A1    Apr. 21, 2005

Related U.S. Application Data

(63) Continuation of application No. 10/069,151, filed on Jun. 20, 2002, now Pat. No. 6,702,604.

(60) Provisional application No. 60/150,307, filed on Aug. 23, 1999.

(30) Foreign Application Priority Data
Aug. 22, 2000    (WO) ................ PCT/IB00/01148

(51) Int. Cl.
*H01R 24/14* (2006.01)

(52) U.S. Cl. .................. 439/374; 248/121; 248/917; 361/681; 439/929

(58) Field of Classification Search ............ 439/374, 439/532, 929; 248/917–919, 121; 361/681–683
See application file for complete search history.

(56) References Cited

U.S. PATENT DOCUMENTS

| 3,348,116 | A |   | 10/1967 | Freeman et al. |
| 4,345,147 | A | * | 8/1982 | Aaron et al. ............... 235/385 |
| 4,547,027 | A |   | 10/1985 | Scheibenreif |
| 4,589,713 | A |   | 5/1986 | Pfuhl et al. |
| 5,009,384 | A | * | 4/1991 | Gerke et al. .............. 248/343 |

(Continued)

FOREIGN PATENT DOCUMENTS

EP    0424074    4/1991

(Continued)

OTHER PUBLICATIONS

Palm Historical Timeline, to 2000 (available on the web at www.palm.com/us/company/corporate/timeline.html), screen shot provided, dated Jun. 27, 2006.

(Continued)

*Primary Examiner*—Michael C. Zarroli

(57) ABSTRACT

A universal connector apparatus comprising a first component and a second component. The first component is fixedly secured to a housing of an LCD monitor and includes a wedge shaped projection or protrusion and a first electrical connector. The second component forms a docking station and is fixedly secured to any other support surface where the LCD monitor is to be attached and supported from. The second component includes a second electrical connector intended to matingly engage with the first electrical connector. The LCD monitor is attached to the second component by slid ably engaging the wedge shaped protrusion or projection of the first component into a wedge shaped recess formed in the second component. This automatically centers the two electrical connectors before they matingly engage one another and prevents damage to the male pins of the male electrical connector. The apparatus enables an LCD monitor to be quickly and easily attached and released from a support surface incorporating the second component so that the monitor may be used at a different location as may be needed.

48 Claims, 8 Drawing Sheets

U.S. PATENT DOCUMENTS

| | | | |
|---|---|---|---|
| 5,128,662 A | 7/1992 | Failla | |
| 5,144,290 A | 9/1992 | Honda et al. | |
| 5,168,429 A | 12/1992 | Hosoi | |
| 5,193,069 A | 3/1993 | Furuya | |
| 5,583,529 A | 12/1996 | Satou | |
| 5,600,580 A | 2/1997 | Honjo et al. | |
| 5,687,939 A | 11/1997 | Moscovitch | |
| 5,768,163 A | 6/1998 | Smith | |
| 5,815,735 A | 9/1998 | Baker | |
| 5,850,358 A * | 12/1998 | Danielson et al. | 713/321 |
| 5,859,628 A * | 1/1999 | Ross et al. | 345/173 |
| 5,859,762 A * | 1/1999 | Clark et al. | 361/686 |
| 5,873,554 A | 2/1999 | Nobuchi | |
| D412,162 S | 7/1999 | Tal et al. | |
| D420,989 S | 2/2000 | Sandhu et al. | |
| 6,042,414 A * | 3/2000 | Kunert | 439/374 |
| 6,134,103 A | 10/2000 | Ghanma | |
| 6,231,371 B1 | 5/2001 | Helot | |
| 6,246,577 B1 | 6/2001 | Han et al. | |
| 6,290,534 B1 * | 9/2001 | Sadler | 439/534 |
| 6,343,006 B1 | 1/2002 | Moscovitch | |
| 6,364,697 B1 | 4/2002 | Tseng et al. | |
| 6,366,453 B1 | 4/2002 | Wang et al. | |
| 6,400,560 B1 * | 6/2002 | Chian | 361/681 |
| 6,963,487 B2 | 11/2005 | Billington et al. | |

FOREIGN PATENT DOCUMENTS

| | | |
|---|---|---|
| JP | 10171382 | 6/1998 |
| WO | 99/39328 | 8/1999 |
| WO | 99/50813 | 10/1999 |
| WO | 0039493 | 7/2000 |

OTHER PUBLICATIONS

Pogue, David; Palm Pilot; The Ultimate Guide; Jun. 1, 1998; chap. 1, p. 4; O'Reilly Publishing (available on the web at www.oreilly.com/catalog/palmpilot/chapter/ppch01.pdf).

Strietelmeier, Julie; Palm III Review; Mar. 23, 1999 (available on the web at www.the-gadgeteer.com/review/palm_iii_review).

* cited by examiner

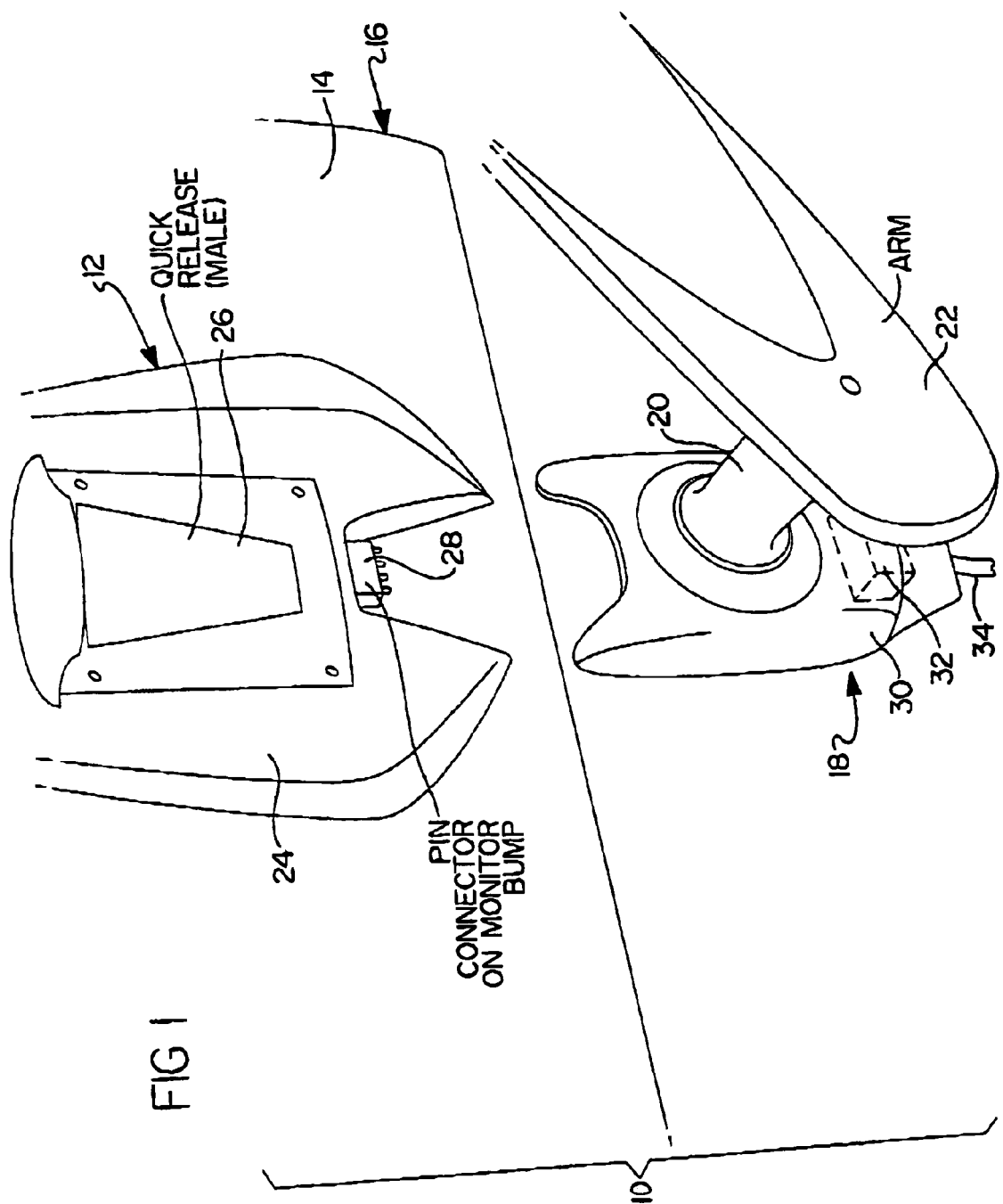

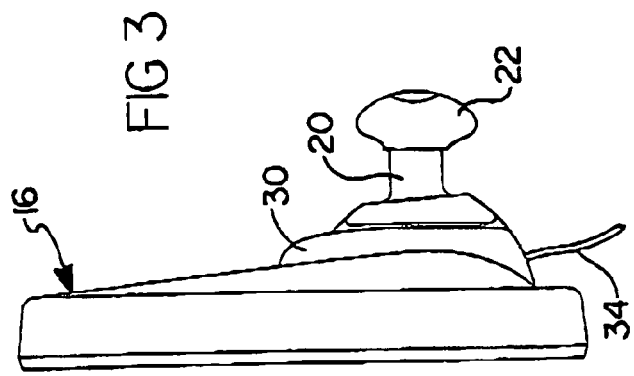
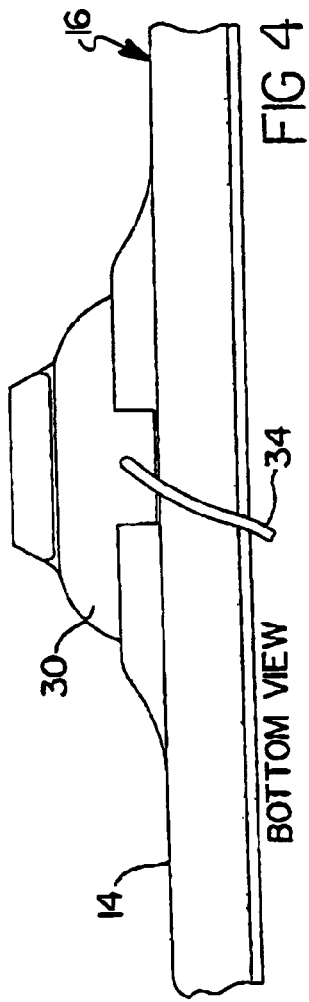
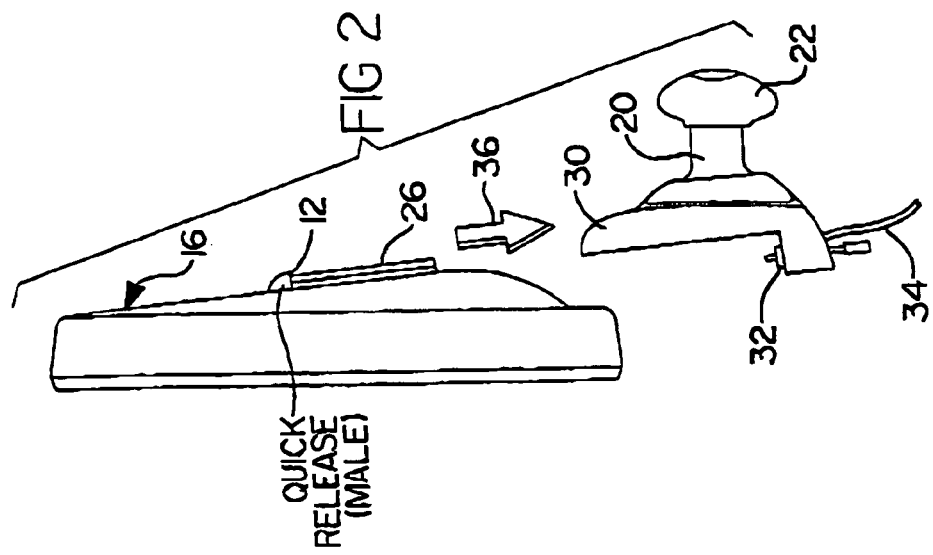

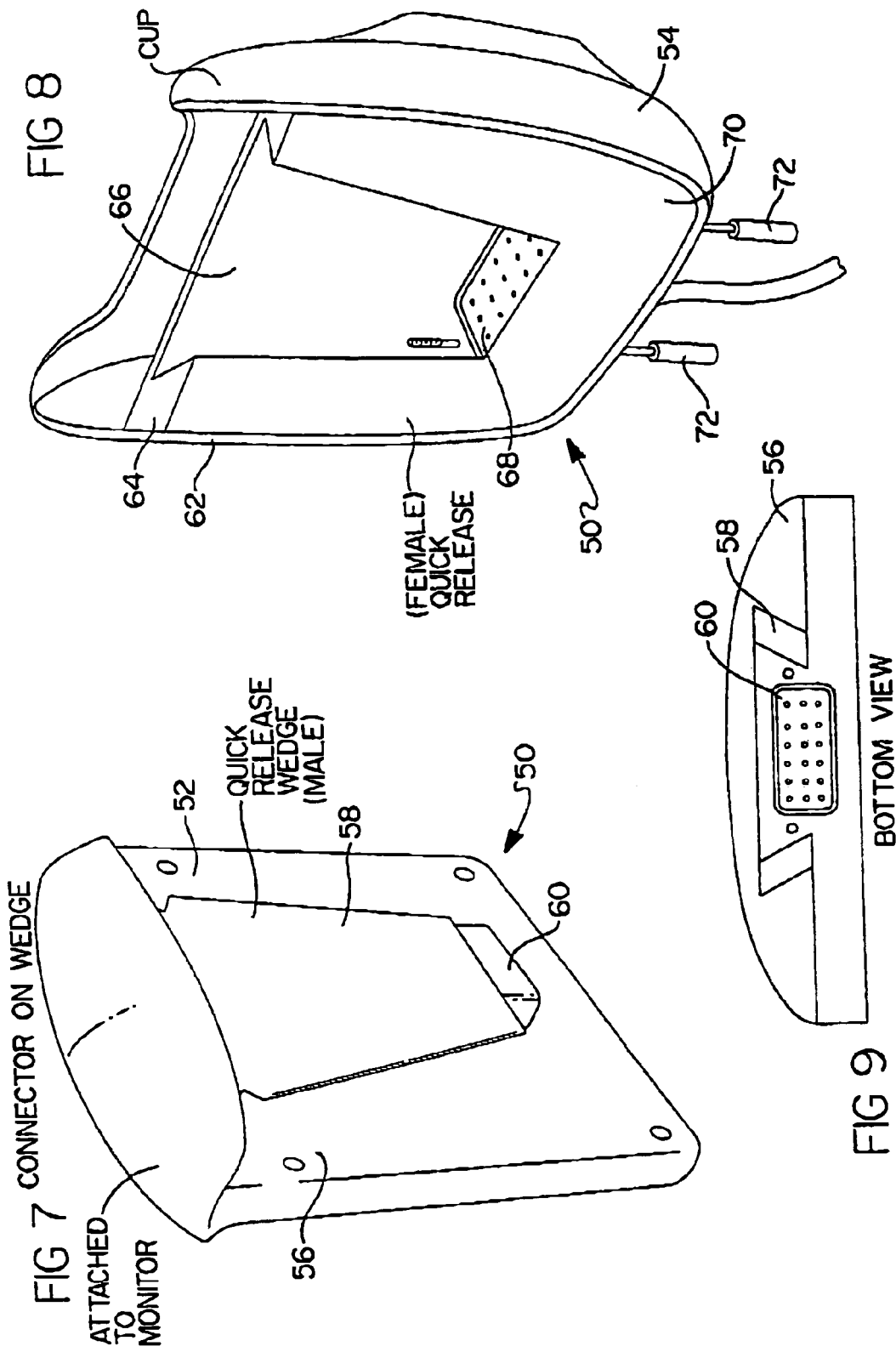

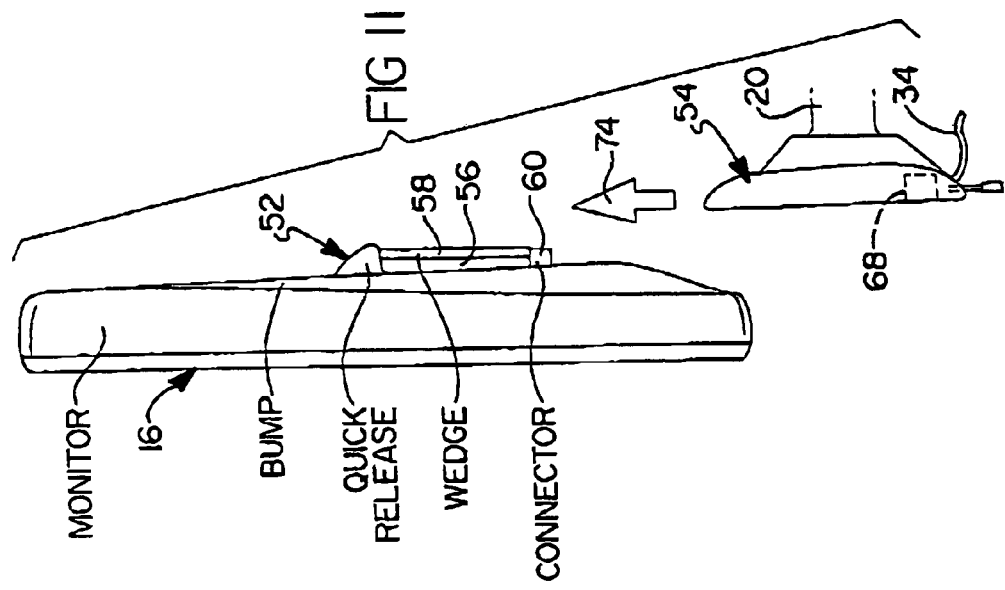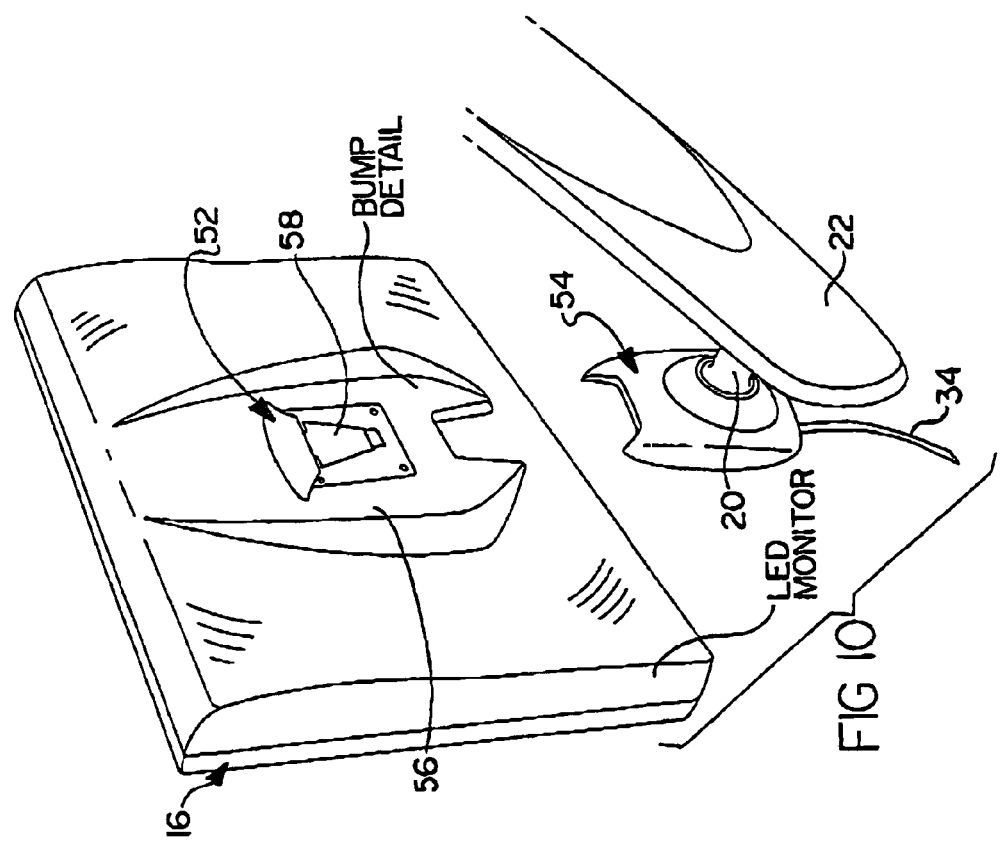

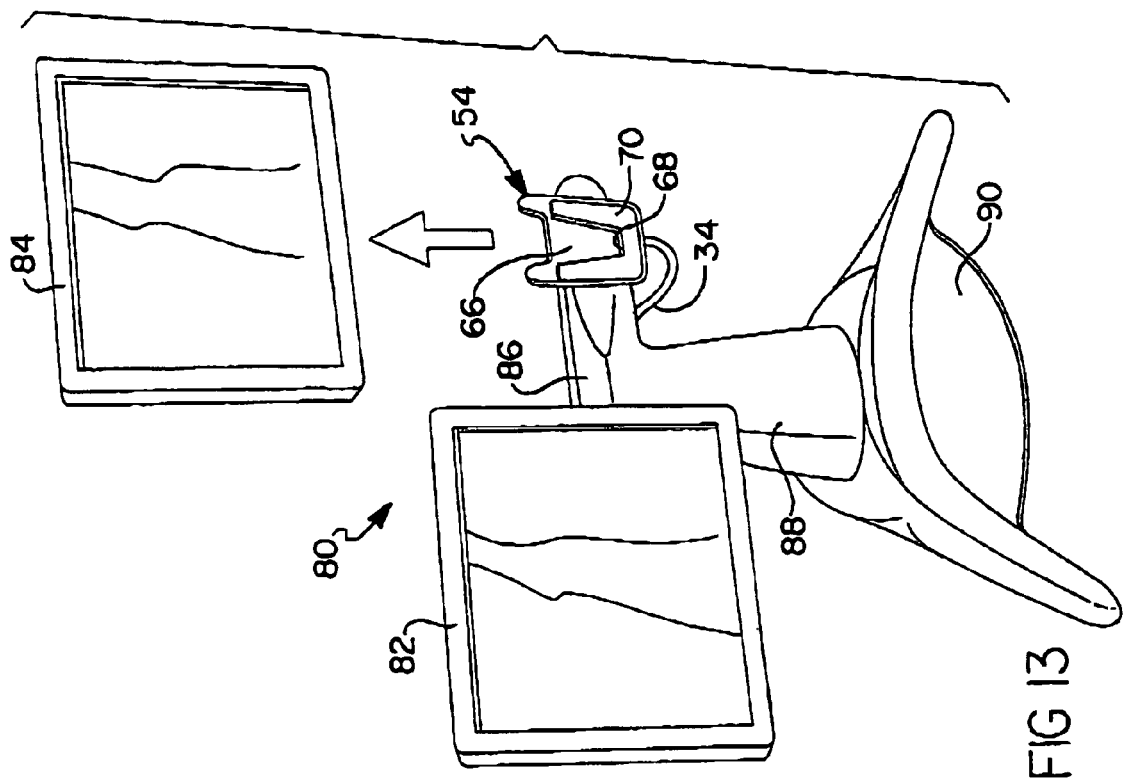
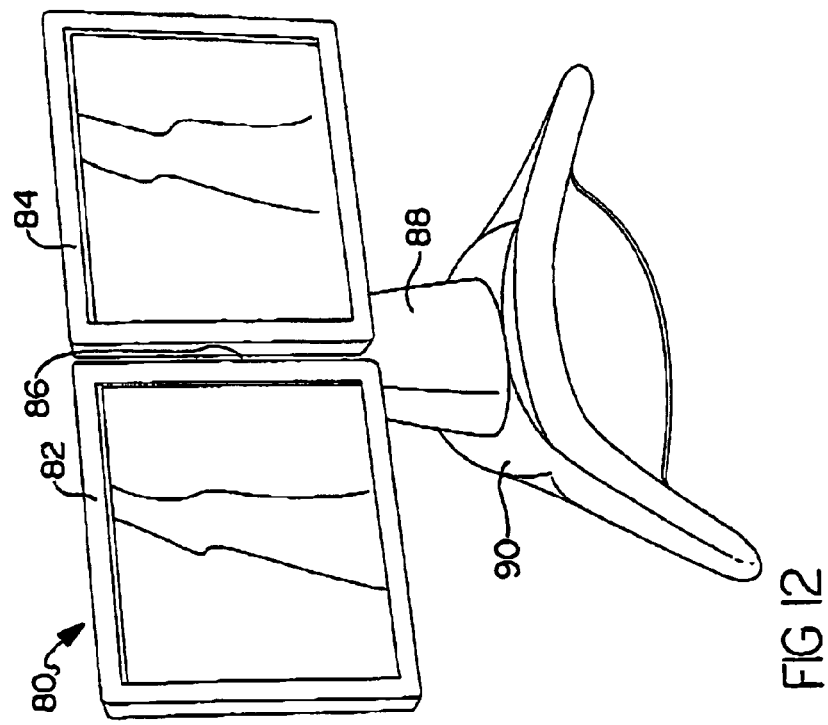

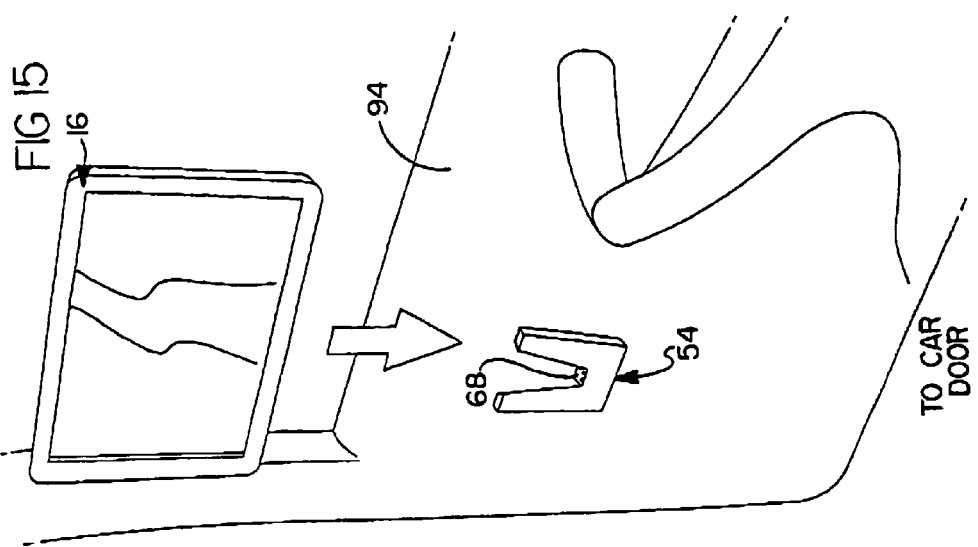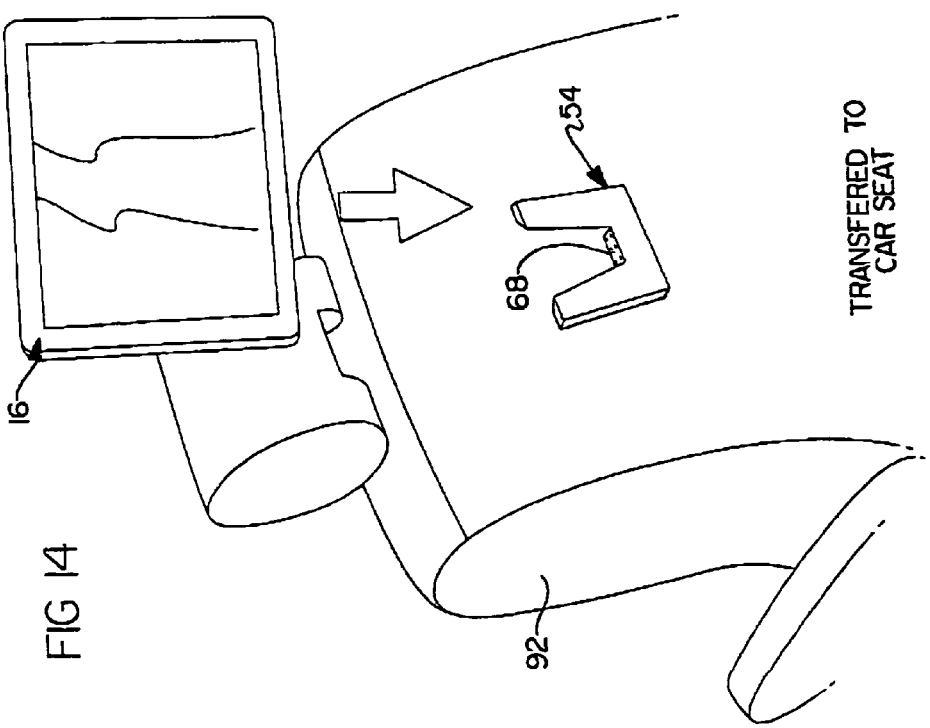

UNIVERSAL QUICK CONNECTOR APPARATUS FOR AN LCD MONITOR

CROSS-REFERENCE TO RELATED APPLICATIONS

This application claims priority to U.S. application Ser. No. 10/069,151, which claimed priority to U.S. Provisional Application No. 60/150,307, filed on Aug. 23, 1999, the contents of all the preceding applications being incorporated by reference herein.

FIELD OF THE INVENTION

This invention relates to LCD systems, and more particularly to an LCD display system which incorporates a quick connect/release connector apparatus for enabling an LCD monitor to be electrically and mechanically coupled, simultaneously, to a support member, through a quick and easy sliding movement of the LCD monitor.

BACKGROUND OF THE INVENTION

LCD monitors have become increasingly popular in a wide variety of applications. Such monitors are lightweight, when compared to CRT type monitors, and therefore much more easily handled by an individual. LCD monitors are often used in applications where two or more monitors are often required, such as in the financial industry, where multiple graphs of information need to be viewed in real time. Multiple monitor applications are also found in use in engineering applications, manufacturing applications, and a wide variety of other applications where a large amount of information needs to be displayed simultaneously for the user(s).

Often such multiple LCD monitor systems are supported on a common arm. The arm is typically held above the worksurface, such as a desk or table, by a vertical column attached to a base. Frequently the need arises to remove one LCD monitor and use it with a separate workstation area. Since LCD monitors are still relatively expensive as compared with CRT monitors, and further attached to a display stand to form a single assembly, it is not possible to easily remove one LCD monitor from a display system and connect it to another workstation where the need for the LCD monitor is more acute. Thus, it is either not possible or highly impractical to disconnect LCD monitors from various work areas and reconnect them at workstations where a particularly acute need for the additional monitor has arisen. The operation of electrically disconnecting the video cable from the LCD monitor, and then mechanically uncoupling the LCD from its support or base (if such was even provided for by the manufacturer of the display system), and then reconnecting the LCD monitor both electrically and mechanically to a different LCD display system and associated computer, would be extremely time consuming and cumbersome.

The lack of a present day means to conveniently electrically and mechanically mount an LCD monitor, removably, on some form of a cooperating docking station thus significantly limits the utility of the monitor by preventing it from being easily removed from use in one application and physically taken by the user to be used in another application. For example, the lack of such a coupling/connector system prevents an LCD monitor used with a computer at a user's workplace from being easily uncoupled and taken home for use with a home computer. Providing a connector system which would allow quick and easy electrical and mechanically coupling and uncoupling of the LCD monitor would allow it to be easily taken by the user and used wherever it may be needed.

Accordingly, it is a principal object of the present invention to provide a universal connector apparatus which enables an electrical and mechanical connection to be made, generally simultaneously, between an LCD monitor and a docking station of a supporting member, thus allowing the LCD monitor to be used.

It is a further object of the present invention to provide a connector apparatus for an LCD monitor which is relatively inexpensive to produce, lightweight, compact and which does not require any special tools such as screwdrivers, pliers, etc., to enable an LCD monitor to be uncoupled, both electrically and mechanically, from a support member.

It is still a further object of the present invention to provide a universal connector apparatus which enables two or more LCD monitors, each having one portion of the connector apparatus, to be electrically and mechanically coupled, and interchanged as needed, to one or more second portions of the connector apparatus. In this manner any number of LCD monitors could be coupled or interchanged as needed to a support member or docking station without any modification to the LCD monitor or the support member/docking station.

SUMMARY OF THE INVENTION

The present invention relates to a universal connector apparatus having a first component and a second component The first component is intended to be fixedly secured to an LCD monitor on an exterior surface thereof, and preferably on a rear or bottom portion of a housing thereof. The second component is a mating component which is intended to be fixedly secured to any form of support member or surface. The first member comprises a housing having an electrical connector, preferably a male connector. The second member comprises a housing in the form of a cup which has a mating electrical connector, and preferably a female connector, fixedly mounted therein.

The housing of the first component further includes an integrally formed protrusion which, in one embodiment, comprises a wedge shaped protrusion. The housing of the second component comprises a recess which is shaped complementarily to the projection on the first component of the connector assembly. Accordingly, when a wedge shaped protrusion is employed, then a similarly sized wedge shaped recess will be employed in the housing of the second component.

The electrical connector component mounted within the housing of the second component is preferably mounted at the bottom of the recess. When the projection of the first component is slidably inserted into the recess of the second component, both a mechanical and an electrical connection are made almost simultaneously. If a wedge shaped projection and recess is employed, the wedge shape provides the added benefit of automatically aligning the male and female electrical connectors as they are slid into mating engagement with one another.

It will be appreciated that the two piece connector apparatus described above can be used in a wide variety of applications, such as within vehicles, on wall mounted monitor support arms, directly on walls, or wherever desired. The only limitation is that the surface that the second component is attached to has sufficient area and strength to allow the second component to be fixedly attached to it.

BRIEF DESCRIPTION OF THE DRAWINGS

The various advantages of the present invention will become apparent to one skilled in the art by reading the following specification and by referencing the following drawings, in which:

FIG. 1 is a perspective view of a portion of a rear area of an LCD monitor incorporating a preferred embodiment of a first component of the universal connector apparatus, and a portion of a support arm incorporating a preferred embodiment of a second component of the apparatus, with the two components about to be slidably engaged with one another;

FIG. 2 is a side view of the LCD monitor of FIG. 1 about to be slidably engaged with the support arm through the use of the two connector components;

FIG. 3 is a side view of the LCD monitor and support arm of FIG. 2 coupled together through the use of the connector apparatus;

FIG. 4 is a bottom view of the LCD monitor and support arm of FIG. 3 illustrating the slim-line profile of the coupled components;

FIG. 7 is a perspective view of an alternative preferred embodiment of the first component of the connector apparatus;

FIG. 8 is a perspective view of a mating second component for the first component shown in FIG. 7;

FIG. 9 is a bottom view of the first component shown in FIG. 7;

FIG. 10 is a perspective view of the first component of FIG. 7 attached to a rear area of a housing of an LCD monitor, and ready to be slidably coupled to the second component of FIG. 8, which is in turn coupled to a support arm;

FIG. 11 is a side view of the system shown in FIG. 10;

FIG. 12 is a perspective view of two LCD monitors being supported on a support member, where at least the right LCD is coupled to the support arm through the use of one of the embodiments of the connector apparatus of the present invention;

FIG. 13 shows the display system of FIG. 11 with the right monitor uncoupled from the support arm;

FIG. 14 shows an alternative application of the connector apparatus of the present invention being used to releasably couple an LCD monitor to the rear of a vehicle seat;

FIG. 15 shows another alternative application where an LCD monitor is releasably coupled to an inside of a vehicle door;

DETAILED DESCRIPTION OF THE PREFERRED EMBODIMENTS

Figure 6:
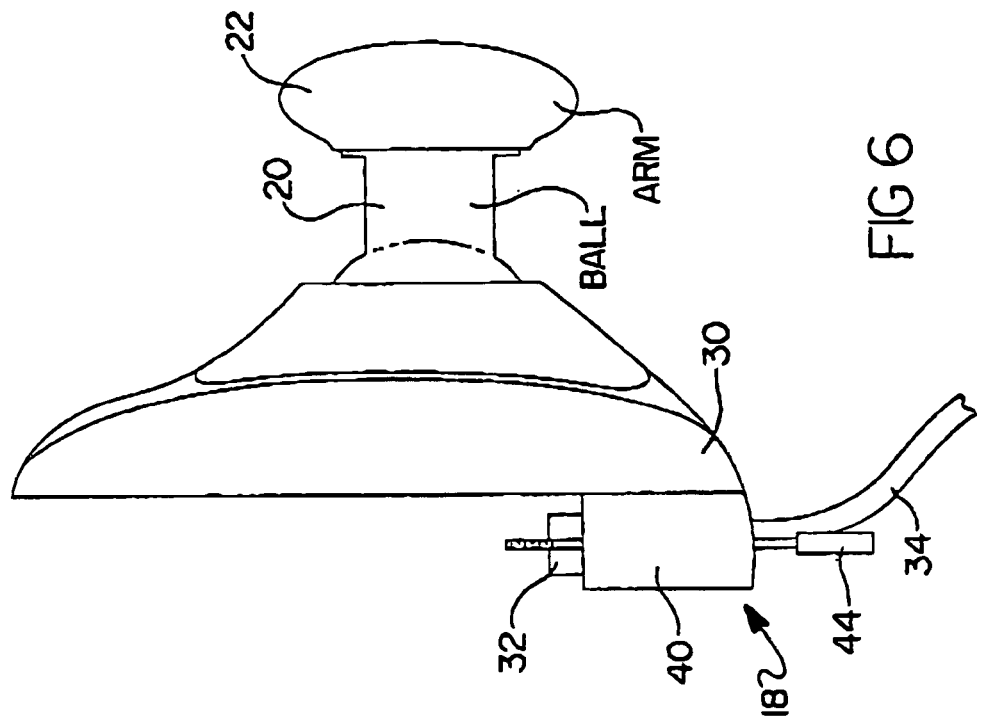
FIG. 6 is a side view of the second component coupled to a ball joint associated with a horizontal support arm of a display base.

Referring to FIG. 1, there is shown a connector apparatus 10 in accordance with a preferred embodiment of the present invention. The connector apparatus 10 includes a first component 12 which is fixedly attached to a housing 14 of a liquid crystal display (LCD) monitor 16. The first connector 12 is preferably attached to a rear or bottom surface of the housing 14, but it will be appreciated that the first component 12 could be secured at other locations on the housing provided sufficient area is available to attach the component 12. A second connector component 18 forms a docking station and is attached, in this embodiment, to a ball joint 20, which is in turn attached to a support arm 22. The ball joint 20 allows the second component 18 to be moved as needed relative to the support arm 22 and, therefore, to allow the LCD monitor 16 to be adjusted for an optimum viewing angle.

With further reference to FIG. 1, the first component 12 includes a housing 24 having a wedge shaped protrusion 26. Below the wedge shaped protrusion is an electrical connector 28 which, in this embodiment, is illustrated as a male connector. The second component 18 includes a cup shaped housing 30 within which is disposed a second electrical connector 32. A video cable 34 is electrically coupled to the electrical connector 32. In this embodiment, the electrical connector 32 comprises a female connector. It will be appreciated, however, that the electrical connector 28 of the first component 12 could be a female component and the connector 32 could be a male component.

Referring to FIG. 2, the LCD monitor 16 is shown about to be attached to the second component 18 of the connector apparatus 10. Arrow 36 indicates that the LCD monitor 16 is moved slidably down onto the cup shaped housing 30 to attach the first component 12 to the second component 18 of the connector apparatus 10. The inter coupled components 12 and 18 are illustrated in FIG. 3. When attached as shown in FIG. 3, the first component 12 is disposed generally within the cup shaped housing 30 and electrically and mechanically coupled to the second component 18. Second component 18 thus not only allows an electrical connection to be made with the video cable 34, but also has sufficient strength to support the entire LCD monitor 16. The attached components are also shown in FIG. 4 from a bottom view. FIG. 4 illustrates the generally blended, low profile attachment of the first and second components 12 and 18, respectively.

Figure 5:
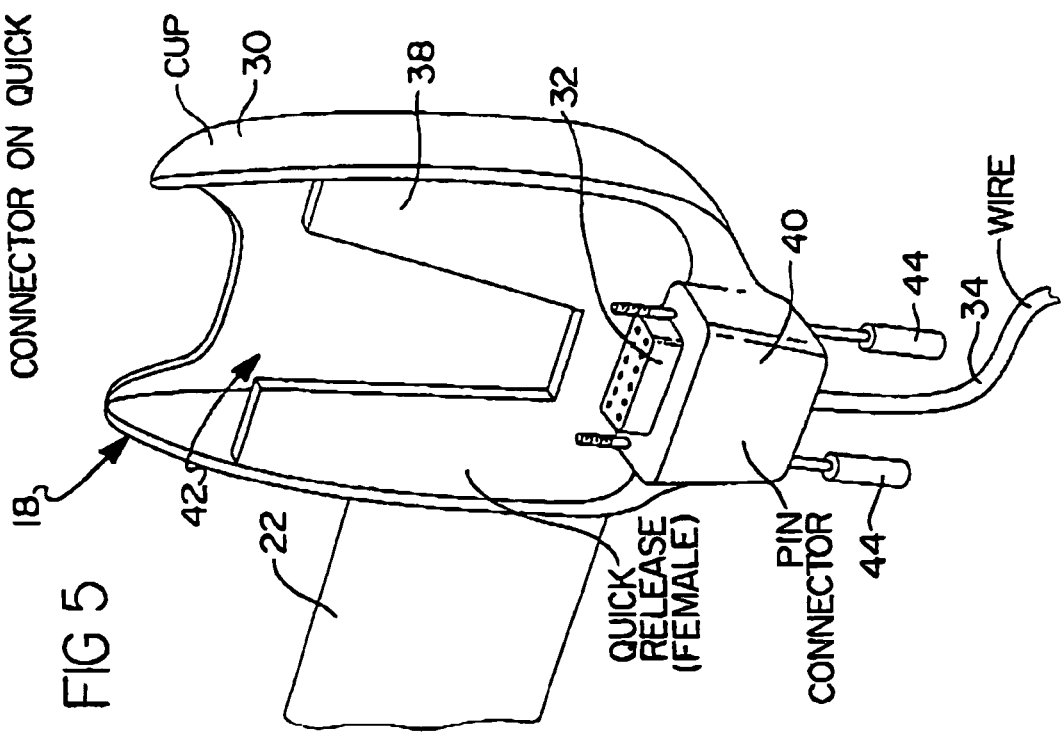
FIG. 5 is a perspective view of the second component of the connector apparatus.

Referring now to FIG. 5, the second component 18 can be seen in greater detail. The cup shaped housing 30 has a wedge component 38 adjacent to a lower housing portion 40 within which the female electrical connector 32 is disposed. A recessed area 42 behind the wedge component 38 provides a small amount of clearance for a portion of the wedge member 26 when member 26 is inserted into the second component 18. The interengagement of the wedge shaped portion 26 and the wedge shaped member 38 serves to automatically align the male pins of electrical connector 28 (FIG. 1) with the electrical connector 32 when the first component 12 is slidably attached to the second component 18. Threaded screws 44 can then be used to even more positively secure the two electrical connectors 28 and 32 to one another. The generally low profile arrangement of the second connector 18 is shown further in FIG. 6.

The connector apparatus 10 of the present invention thus enables the LCD monitor 16 to be slidably coupled to a support arm 22 such that the entire LCD monitor 16 can be supported securely. The intercoupling of the first and second components 12 and 18, respectively, does not require time consuming disassembly or any special tools. When it is desired to remove the monitor 16 from the cup shaped housing 30 of the second component 18, the user merely lifts the LCD monitor 16 upwardly and the entire unit will slidably disengage from the electrical connector 32 (provided threaded screws 44 are not engaged with connector 28). The wedge shaped components 26 and 38 further ensure that the electrical connectors 28 and 32 will be perfectly aligned every time the LCD monitor 16 is secured to the second component 18.

Referring now to FIGS. 7 and 8, a connector apparatus 50 in accordance with an alternative preferred embodiment of the present invention is shown. The connector apparatus 50 generally comprises a first component 52 and a second component 54. The first component 52 is intended to be secured fixedly to a housing portion of an LCD monitor, just as shown in FIG. 1. The second component 54 is similarly intended to be fixedly secured to any other form of support member which is used to support the LCD monitor attached to the first component 52. The first component 52 similarly includes a housing 56 with a wedge shaped protrusion 58 projecting therefrom. An electrical connector 60, in this embodiment a male connector, is secured to the housing 56 at the bottom of the wedge shaped protrusion 58. The orientation of the electrical connector 60 is shown in FIG. 9.

Referring to FIG. 8, the second component 54 is shown in greater detail. The second component 54 includes a cup shaped housing 62 having a component 64 forming a wedge shaped recess 66. An electrical connector 68 is disposed within a lower portion 70 of the wedge shaped member 64. Threaded screws 72 may be included or used with the connector 68 to help secure the connector 68 to the connector 60.

Securing of the first component 52 to the second component 54 is otherwise identical to the connector apparatus 10. The LCD monitor attached to the first component 52 is positioned adjacent the second component 54 and then lowered such that the wedge shaped protrusion 58 slidably engages within the wedge shaped recess 66. The wedge shaped recess 66 serves to automatically center and align the connector 60 with the connector 68 as the first component 52 fully slidably engages the second component 54.

With both of the embodiments 10 and 50 of the present invention, it will be appreciated that electrical connectors 28 and 60, respectively, are each electrically coupled to the display element of the LCD monitor to which they are secured. Thus, one side of each of connectors 28 and 60 will have electrical conductors in communication with the display element. Each of the first components 12 and 52 may be attached to a housing of an LCD monitor by threaded screws or any other means which securely affixes the body of the component 12 or 52 to a portion of the housing of the LCD monitor. Alternatively, it may be advantageous to form the first components 12 or 52 with the housing of the LCD monitor.

Referring now to FIGS. 10 and 11, the sliding attachment of the first component 52 with the second component can be seen. The first component 52 is shown attached to the LCD monitor 16 Arrow 74 in FIG. 11 indicates the direction of movement of the second component 54 relative to the first component 52 in order to effect attachment of the two components together.

Referring now to FIG. 12, a dual screen LCD monitor system 80 is shown incorporating LCD monitors 82 and 84 LCD monitors 82 and 84 are supported on a generally horizontally disposed arm 86, which is in turn supported on a generally vertically disposed column 88. The column 88 is in turn supported on a base 90. In FIG. 13, it can be seen how LCD monitor 84 can be lifted off of the second component 54 by lifting upwardly on the LCD monitor 84.

In FIG. 14, it can be seen how the second component 54 can be modified to omit the cup shaped housing 62 and could be attached to a seat 92 within a vehicle to allow LCD monitor 16 to be releasably detached from the second component 54 and removed from the vehicle. FIG. 15 similarly shows the second component 54 attached to an inside of a vehicle door 94 which allows the LCD monitor 16 to be removed from its location on a vehicle door and taken from the vehicle.

Figure 17:
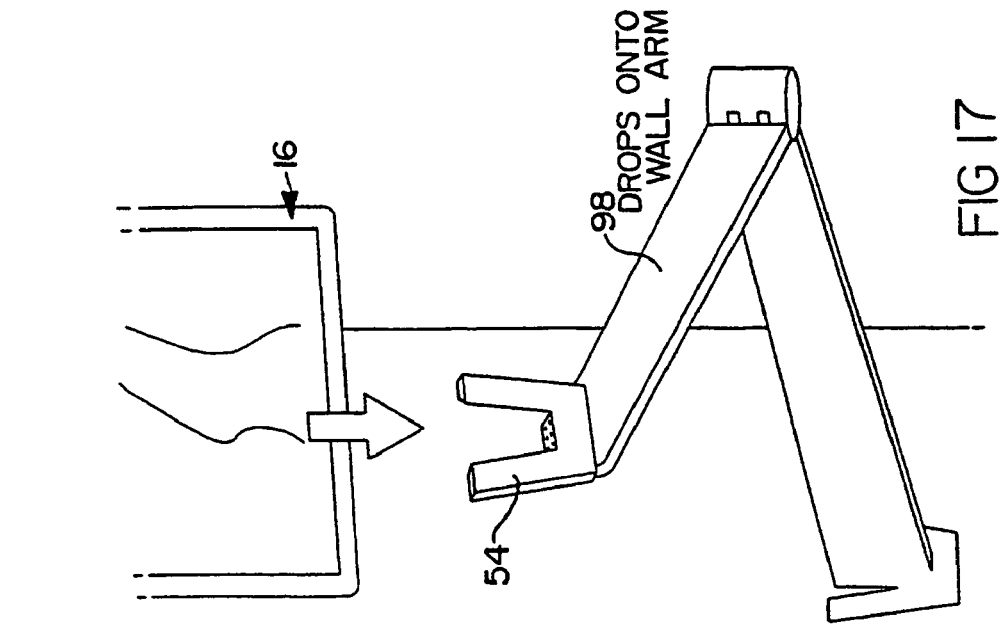
FIG. 17 is a perspective view of an LCD monitor about to be releasably coupled to a pivoting display arm attached to a wall surface.
Figure 16:
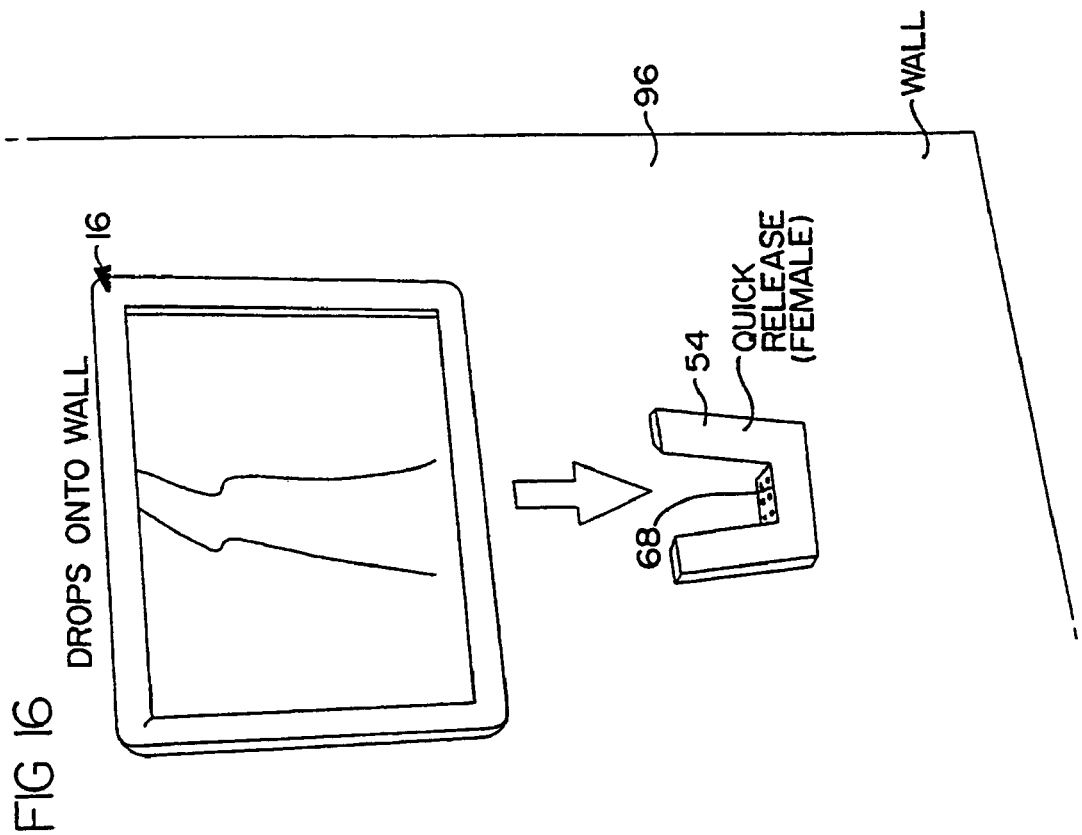
FIG. 16 is a perspective view of an LCD monitor about to be supported on a vertical wall through the use of the connector apparatus of the present invention.

Referring now to FIG. 16, the second component 54 is shown attached to a wall 96. The LCD monitor 16 can thus be supported on the wall 96 simply by dropping the monitor slidably onto the second component 54 such that the first and second components 52 and 54, respectively, become slidably engaged In FIG. 17, the second component 54 is shown secured to a pivotal support arm 98, which is also attached to the wall 96. The LCD monitor 16 can be attached to the second component 54 as described hereinbefore.

It will be appreciated then that the preferred embodiments of the present invention allow an LCD monitor to be quickly and easily coupled to and uncoupled from a support member without the need for complicated disassembly procedures. The wedge shaped portions of each of the first and second components of the present invention further enable the electrical connectors of the first and second components to be aligned precisely as the first component attached to the LCD monitor is slidably engaged with the second component. Thus, there is little or no chance that the user will damage the male pins of the male electrical connector during reattachment of the monitor to the second component.

It will further be appreciated that a principal advantage of the connector apparatus 10 or 50 of the present invention is that it allows one LCD monitor to be used at a variety of locations where the second component of the apparatus is in use. This provides much greater versatility for an LCD display monitor by allowing it to be used in a variety of environments where the need may arise.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A connector apparatus for allowing quick electrical and mechanical coupling and decoupling of a display to a support member disposed within a vehicle, at a wall, or on a rear portion of a seat, the apparatus comprising:
    (a) a first mounting component for the display, the first mounting component having a first engaging member and a first electrical connector; and
    (b) a second mounting component for the support member disposed within the vehicle, the second mounting component including a second engaging member having a shape complementary to the first engaging member and a second electrical connector, the second engaging member being configured to engage with the first engaging member to physically support the display on the support member disposed within the vehicle, at the wall, or on the rear portion of the seat, while the first electrical connector concurrently electrically couples the second electrical connector to permit electrical communication between the two electrical connectors wherein one of the first engaging member and the second engaging member includes an insertion portion and the other of the first engaging member and the second engaging member includes a recess adapted to receive the insertion portion, the recess having a leading portion for receiving the insertion portion upon insertion thereof into the recess and that is wider than a non-leading portion of the recess adapted to receive the insertion portion subsequent to insertion thereof into the leading portion of the recess.

2. A mounting component for a support member disposed within a vehicle, at a wall, or on a rear portion of a seat for supporting a display on the support member so as to allow quick electrical and mechanical coupling and decoupling of the display to the support member, the mounting component comprising:
(a) a first engaging member; and
(b) a first electrical connector;
wherein the mounting component is configured for selective coupling to a second mounting component mounted on the display and including a second engaging member having a shape complementary to the first engaging member and a second electrical connector, so that when the first engaging member engages the second engaging member, the display will be physically supported on the support member in the vehicle, at the wall, or on the rear portion of the seat while the first electrical connector concurrently electrically couples the second electrical connector to also cause electrical communication between the two electrical connectors, wherein the first engaging member includes an insertion portion that is adapted to be received within a recess on the second engaging member having a leading portion for receiving the insertion portion of the first engaging member upon insertion thereof into the recess where the leading portion of the recess is wider than a non-leading portion of the recess adapted to receive the insertion portion of the first engaging member subsequent to insertion thereof into the leading portion of the recess.

3. A connector apparatus for allowing quick electrical and mechanical coupling and decoupling of a display to a support member disposed within a vehicle, at a wall, or on a rear portion of a seat, the apparatus comprising:
(a) a first mounting component for the display, the first mounting component having a first engaging member and a first electrical connector; and
(b) a second mounting component for the support member disposed within the vehicle, the second mounting component including a second engaging member having a shape complementary to the first engaging member and a second electrical connector, the second engaging member being configured to engage with the first engaging member to physically support the display on the support member disposed within the vehicle, at the wall, or on the rear portion of the seat, while the first electrical connector concurrently electrically couples the second electrical connector to permit electrical communication between the two electrical connectors wherein the first engaging member includes a recess for receiving at least part of the second engaging member, the recess having a leading portion for receiving the at least part of the second engaging member upon insertion thereof into the recess, the leading portion of the recess being wider than a non-leading portion of the recess adapted to receive the at least part of the second engaging member subsequent to insertion thereof into the leading portion of the recess.

4. A connector apparatus for allowing quick electrical and mechanical coupling and decoupling of a display substantially limited to displaying results of computer operations performed remote from the display to a support member, the apparatus comprising:
(a) the display having a first mounting component, the first mounting component having a first engaging member and a first electrical connector; and
(b) a second mounting component for the support member, the second mounting component including a second engaging member having a shape complementary to the first engaging member and a second electrical connector, the second engaging member being configured to engage with the first engaging member to physically support the display on the support member, while the first electrical connector concurrently electrically couples the second electrical connector, whereby as long as the second engaging member is engaged with the first engaging member, electrical communication between the two electrical connectors is possible.

5. The connector apparatus of claim 4, wherein the first engaging member and the second engaging member are shaped to prevent accidental decoupling of the display from the support member.

6. The connector apparatus of claim 4, wherein engagement of the first engaging member and the second engaging member supports substantially all of the weight of the display.

7. The connector apparatus of claim 4, further comprising securing means for securing the first mounting component to the second mounting component when the first engaging member and the second engaging member are engaged.

8. The connector apparatus of claim 4, wherein the first and second electrical connectors mechanically engage one another when the first and second mounting components are mechanically engaged.

9. A connector apparatus for allowing quick electrical and mechanical coupling and decoupling of a display substantially limited to displaying results of computer operations performed remote from the display to a support member, the apparatus comprising:
(a) the display having a first mounting component, the first mounting component having a first engaging member and a first electrical connector; and
(b) a second mounting component for the support member, the second mounting component including a second engaging member having a shape complementary to the first engaging member and a second electrical connector, the second engaging member being configured to engage with the first engaging member to physically support the display on the support member, while the first electrical connector concurrently electrically couples the second electrical connector to permit electrical communication between the two electrical connectors, wherein one of the first engaging member or the second engaging member includes an insertion portion and the other of the first engaging member or the second engaging member includes a recess adapted to receive the insertion portion, the recess having a leading portion for receiving the insertion portion upon insertion thereof into the recess and that is wider than a non-leading portion of the recess adapted to receive the insertion portion subsequent to insertion thereof into the leading portion of the recess.

10. A display substantially limited to displaying results of computer operations performed remote from the display, and having a mounting component for allowing quick electrical and mechanical coupling and decoupling of the display to a support member, the mounting component comprising:
(a) a first engaging member; and
(b) a first electrical connector;
wherein the mounting component is configured for selective coupling to a second mounting component mounted on the support member and including a second engaging member having a shape complementary to the first engaging member and a second electrical connector, so that when the first engaging member engages the second engaging member, the display will be physically supported on the support member while the first electrical connector concurrently electrically couples the second electrical connector, whereby as long as the second engaging member is engaged with the first engaging member, electrical communication between the two electrical connectors is possible.

11. The display of claim 10, wherein the first engaging member is shaped so that, upon engagement thereof with the second engaging member, accidental decoupling of the display from the support member is prevented.

12. The display of claim 10, wherein the first engaging member is adapted to support substantially all of the weight of the display upon engagement of the first engaging member with the second engaging member.

13. The display of claim 10, further comprising securing means for securing the first mounting component to the second mounting component when the first engaging member and the second engaging member are engaged.

14. The display of claim 10, wherein the first and second electrical connectors mechanically engage one another when the first and second mounting components are mechanically engaged.

15. A display substantially limited to displaying results of computer operations performed remote from the display, and having a mounting component for allowing quick electrical and mechanical coupling and decoupling of the display to a support member, the mounting component comprising:
   (a) a first engaging member; and
   (b) a first electrical connector;
   wherein the mounting component is configured for selective coupling to a second mounting component mounted on the support member and including a second engaging member having a shape complementary to the first engaging member and a second electrical connector, so that when the first engaging member engages the second engaging member, the display will be physically supported on the support member while the first electrical connector concurrently electrically couples the second electrical connector to permit electrical communication between the two electrical connectors wherein the first engaging member includes an insertion portion that is adapted to be received within a recess on the second engaging member having a leading portion for receiving the insertion portion of the first engaging member upon insertion thereof into the recess where the leading portion of the recess is wider than a non-leading portion of the recess adapted to receive the insertion portion of the first engaging member subsequent to insertion thereof into the leading portion of the recess.

16. A display substantially limited to displaying results of computer operations performed remote from the display, and having a mounting component for allowing quick electrical and mechanical coupling and decoupling of the display to a support member, the mounting component comprising:
   (a) a first engaging member; and
   (b) a first electrical connector;
   wherein the mounting component is configured for selective coupling to a second mounting component mounted on the support member and including a second engaging member having a shape complementary to the first engaging member and a second electrical connector, so that when the first engaging member engages the second engaging member, the display will be physically supported on the support member while the first electrical connector concurrently electrically couples the second electrical connector to permit electrical communication between the two electrical connectors wherein the first engaging member includes a recess for receiving at least part of the second engaging member, the recess having a leading portion for receiving the at least part of the second engaging member upon insertion thereof into the recess, the leading portion of the recess being wider than a non-leading portion of the recess adapted to receive the at least part of the second engaging member subsequent to insertion thereof into the leading portion of the recess.

17. A mounting component for a support member disposed on a rear portion of a seat for supporting a display on the support member so as to allow quick electrical and mechanical coupling and decoupling of the display to the support member, the mounting component comprising:
   (a) a first engaging member; and
   (b) a first electrical connector;
   wherein the mounting component is configured for selective coupling to a second mounting component mounted on the display and including a second engaging member having a shape complementary to the first engaging member and a second electrical connector, so that when the first engaging member engages the second engaging member, the display will be physically supported on the support member on the rear portion of the seat while the first electrical connector concurrently electrically couples the second electrical connector to also cause electrical communication between the two electrical connectors wherein the first engaging member includes a recess for receiving at least part of the second engaging member, the recess having a leading portion for receiving the at least part of the second engaging member upon insertion thereof into the recess, the leading portion of the recess being wider than a non-leading portion of the recess adapted to receive the at least part of the second engaging member subsequent to insertion thereof into the leading portion of the recess.

18. A system allowing quick electrical and mechanical coupling and decoupling of a display monitor to a support member, said system comprising:
   the display monitor having a top edge, a bottom edge, a first side edge and a second side edge opposite the first side edge;
   a first component mountable to said display monitor, said first component having a first engaging member and a first electrical connector; and
   a second component mountable to said support member, said second component having a second engaging member and a second electrical connector, wherein said first and second engaging members have complementary shapes to allow the first engaging member to be lowered onto the second engaging member to engage therewith so that the support member physically supports said display screen, while said first electrical connector concurrently couples with said second electrical connector to permit electrical communication therebetween, and wherein the first component and the second component are devoid of elements for receiving any of the four edges of the display monitor.

19. The system of claim 18, wherein the first component is mounted at the rear surface of the display monitor.

20. The system of claim 18, wherein the first engaging member includes a protrusion to be lowered onto the second engaging member to engage therewith.

21. The system of claim 20, wherein the protrusion is wedge-shaped.

22. The system of claim 20, wherein the protrusion is separated from the first electrical connector.

23. The system of claim 18, wherein the second component includes a cup-shaped housing having a housing component forming a recess for receiving the first engaging member of the first component, and for necessitating, during removal of the first engaging member from the recess, an upward lifting of the first engaging member to remove the first engaging member from the recess.

24. The system of claim 18, wherein after engagement of the first engaging member and the second engaging member, substantially all of the weight of the display monitor is supported by the second engaging member.

25. The system of claim 18, wherein neither the first engaging member nor the second engaging member are visible to a user facing the front of the display monitor.

26. The system of claim 18, wherein the first component is mounted on the rear surface of the display monitor and the first component includes a protrusion that is inserted into a recess of the second engaging member.

27. A connector apparatus for allowing quick electrical and mechanical coupling and decoupling of a display monitor to a support member, said connector apparatus comprising:
 a first component having a first engaging member and a first electrical connector; and
 a second component having a second engaging member and a second electrical connector, wherein
 a) the first component is mountable to one of the display monitor and the support member and the second component is mountable to the other one of the display monitor and the support member,
 b) the first engaging member and second engaging member have complementary shapes to allow the first engaging member and the second engaging member to engage so that the support member physically supports said display screen, while said first electrical connector and second electrical connector concurrently couple to permit electrical communication therebetween,
 c) the first engaging member includes the first electrical connector, and
 d) the first component and the second component are devoid of elements for receiving any of a top edge, a bottom edge, a first side edge and an opposite second side edge of the display monitor.

28. The connector apparatus of claim 27, wherein the second engaging member includes the second electrical connector.

29. The system of claim 27, wherein the first component is mounted at the rear surface of the display monitor.

30. The system of claim 27, wherein the first engaging member includes a protrusion that engages with the second engaging member.

31. The system of claim 30, wherein the protrusion is wedge-shaped.

32. The system of claim 27, wherein the second component includes a cup-shaped housing having a housing component forming a recess for receiving the first mating member of the first component, and for necessitating, during removal of the first engaging member from the recess, an upward lifting of the first engaging member to remove the first engaging member from the recess.

33. The system of claim 27, wherein after engagement of the first engaging member and the second engaging member, substantially all of the weight of the display monitor is supported by at least one of the first engaging member and the second engaging member.

34. The system of claim 27, wherein neither the first engaging member nor the second engaging member are visible to a user facing the front of the display monitor.

35. The system of claim 27, wherein the first component is mounted on the rear surface of the display monitor and the first component includes a protrusion that is inserted into a recess of the second engaging member.

36. The system of claim 27, wherein the first component is mounted on the rear surface of the display monitor.

37. The system of claim 18, wherein the display monitor is substantially limited to displaying results of computer operations performed remote from the display monitor.

38. A system having a connector apparatus for allowing quick electrical and mechanical coupling and decoupling of a display monitor to a support member, said connector apparatus comprising:
 a first component having a first engaging member and a first electrical connector; and
 a second component having a second engaging member and a second electrical connector, wherein
 a) the first component is mountable to one of i) at least a portion of a rear surface of the display monitor and ii) the support member, and the second component is mountable to the other one of the at least a portion of the rear surface of the display monitor and the support member, the rear surface being opposite a screen of the display monitor, and
 b) the first engaging member and second engaging member have complementary shapes to allow the first engaging member and the second engaging member to engage so that the support member physically supports said display screen, while said first electrical connector and second electrical connector concurrently couple to permit electrical communication therebetween.

39. The system of claim 38, further comprising the display monitor having the screen, wherein the rear surface of the display monitor is substantially parallel to the screen.

40. The system of claim 39 wherein the display monitor has a top edge, a bottom edge, a first side edge and a second side edge opposite the first side edge and the connector apparatus is devoid of any elements for receiving any of these four edges.

41. The system of claim 40, wherein the display monitor is substantially limited to displaying results of computer operations performed remote from the display monitor.

42. The system of claim 41, wherein after engagement of the first engaging member and the second engaging member, substantially all of the weight of the display monitor is supported by at least one of the first engaging member and the second engaging member.

43. The system of claim 42, wherein neither the first engaging member nor the second engaging member are visible to a user facing the front of the display monitor.

44. The system of claim 43, wherein the first component is mountable to one of a rear surface of the display monitor and the support member with screws.

45. The system of claim 43, wherein the second component is mountable to the other one of the rear surface of the display monitor and the support member with screws.

46. The system of claim 38, wherein the first component is mountable to one of i) the rear surface of the display monitor exclusively and ii) the support member, and the second component is mountable to the other one of the rear surface of the display monitor and the support member.

47. A system having a connector apparatus for allowing quick electrical and mechanical coupling and decoupling of a display monitor to a support member, said connector apparatus comprising:
 a first component having a first engaging member and a first electrical connector; and
 a second component having a second engaging member and a second electrical connector, wherein a) the first component is releasably mountable to the to the display monitor with fasteners, and the second component is releasably mountable to the support member with additional fasteners, and b) the first engaging member and second engaging member have complementary shapes to allow the first engaging member and the second engaging member to engage so that the support member physically supports said display screen, while said first electrical connector and second electrical connector concurrently couple to permit electrical communication therebetween.

48. The system of claim 47, wherein the fasteners are screws and the additional fasteners are screws.

* * * * *